US012606076B2

(12) United States Patent
DeLanghe et al.

(10) Patent No.: US 12,606,076 B2
(45) Date of Patent: Apr. 21, 2026

(54) SNOWMOBILE SKI CLAMP

(71) Applicants: Ernest DeLanghe, Burnsville, MN
(US); Kasey Pipo, Burnsville, MN
(US); William Butterfield, Burnsville,
MN (US); George Runger, Burnsville,
MN (US); Steven Potter, Burnsville,
MN (US); Tyler Jacobson, Burnsville,
MN (US)

(72) Inventors: Ernest DeLanghe, Burnsville, MN
(US); Kasey Pipo, Burnsville, MN
(US); William Butterfield, Burnsville,
MN (US); George Runger, Burnsville,
MN (US); Steven Potter, Burnsville,
MN (US); Tyler Jacobson, Burnsville,
MN (US)

(73) Assignee: CALIBER, INC., Burnsville, MN (US)

( * ) Notice: Subject to any disclaimer, the term of this
patent is extended or adjusted under 35
U.S.C. 154(b) by 142 days.

(21) Appl. No.: 18/500,658

(22) Filed: Nov. 2, 2023

(65) Prior Publication Data

US 2024/0174159 A1     May 30, 2024

Related U.S. Application Data

(60) Provisional application No. 63/421,791, filed on Nov.
2, 2022.

(51) Int. Cl.
B60P 3/06         (2006.01)
F16B 2/18         (2006.01)
(52) U.S. Cl.
CPC ................. B60P 3/062 (2013.01); F16B 2/18
(2013.01); F16B 2/185 (2013.01)

(58) Field of Classification Search
CPC .... B60P 3/062; B60R 9/12; F16B 2/18; F16B
2/185
USPC ...................................... 403/324, 321, 322.1
See application file for complete search history.

(56) References Cited

U.S. PATENT DOCUMENTS 4,671,713 A  *  6/1987  Lenkman ............. A61G 3/0808
                                                  410/7
5,716,175 A  *  2/1998  Fenske .................... B60P 3/062
                                                  410/3
5,785,471 A  *  7/1998  Godbersen ............. B60P 3/062
                                                  410/11
6,086,298 A  *  7/2000  Fanuele ................. B60P 3/073
                                                  410/2
6,139,230 A  * 10/2000  Zizzi ...................... B60P 3/073
                                                  410/2

(Continued)

*Primary Examiner* — Christopher D Hutchens
(74) *Attorney, Agent, or Firm* — Whitestone Law, PLLC

(57) ABSTRACT

A clamp for securing a pair of snowmobile skis to a bed
having an attached loop includes a main body comprising
spaced apart plates configured to provide rigidity to the
clamp and a hook. The clamp includes at least one moveable
plate within the main body having a camming surface
engaged with the hook, and an actuating mechanism proxi-
mate an end of the main body. The actuating mechanism is
configured to position the clamp into an unclamped position
wherein the hook is disengaged from the loop attached to the
bed and a clamped position where the hook engages the loop
and is configured to apply a downward force on the skis by
moving the at least one actuator plate within the main body
to raise the hook through engagement with the camming
surface.

18 Claims, 19 Drawing Sheets

(56)             References Cited

U.S. PATENT DOCUMENTS 6,244,800 B1 *   6/2001   Studanski .............. B60P 3/075
                                                      248/500

* cited by examiner

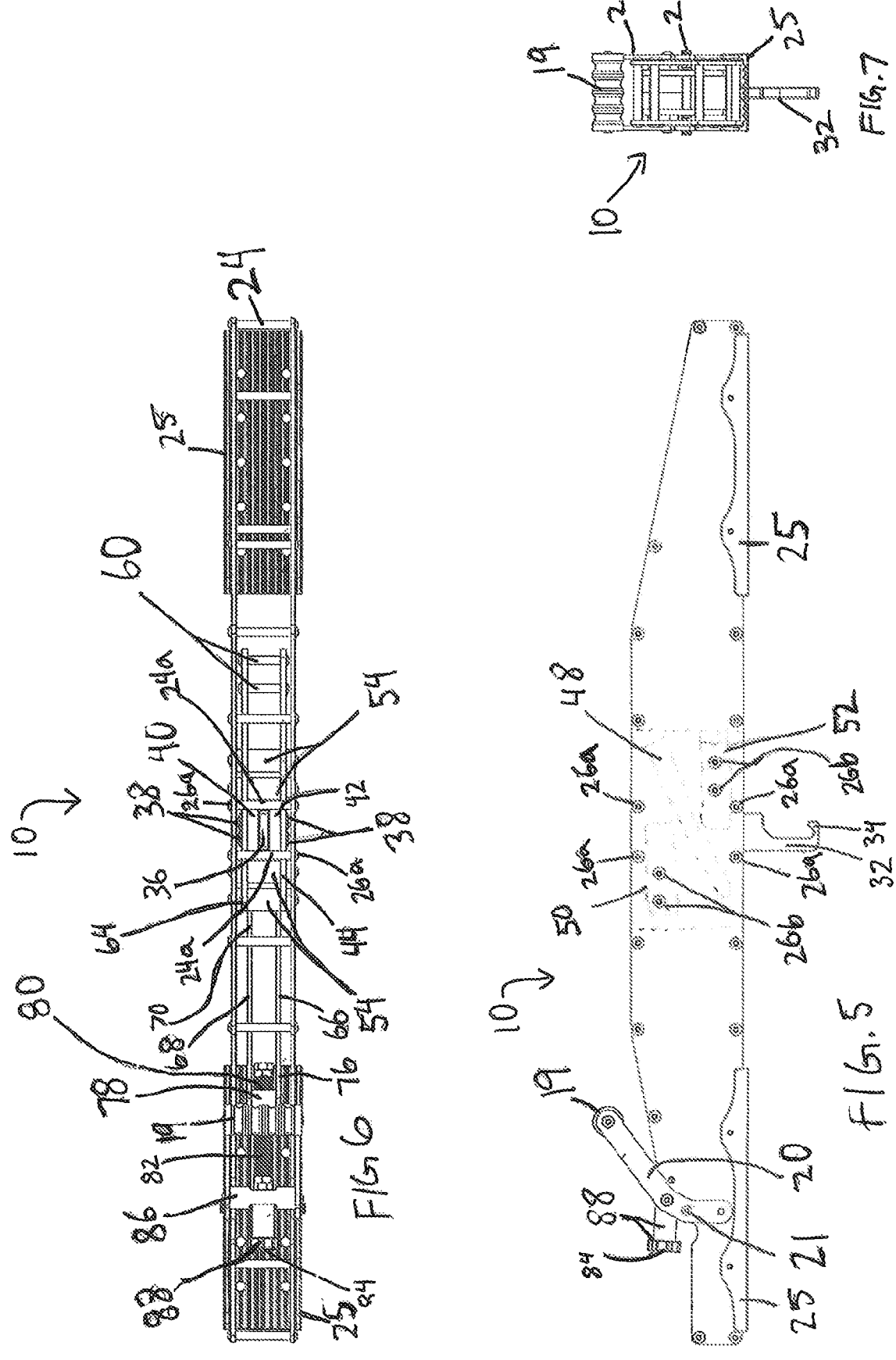

100

100

106

110

116

115

100

106
108

104

110
114
112
111
110

116

113

122

115

200

202

204

220

8

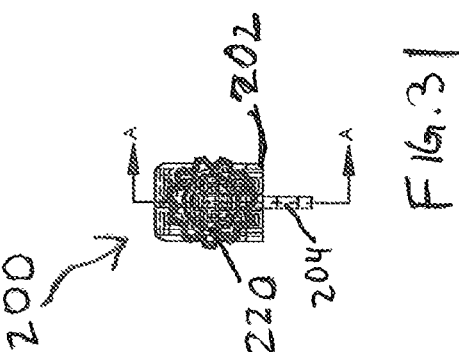
FIG.31
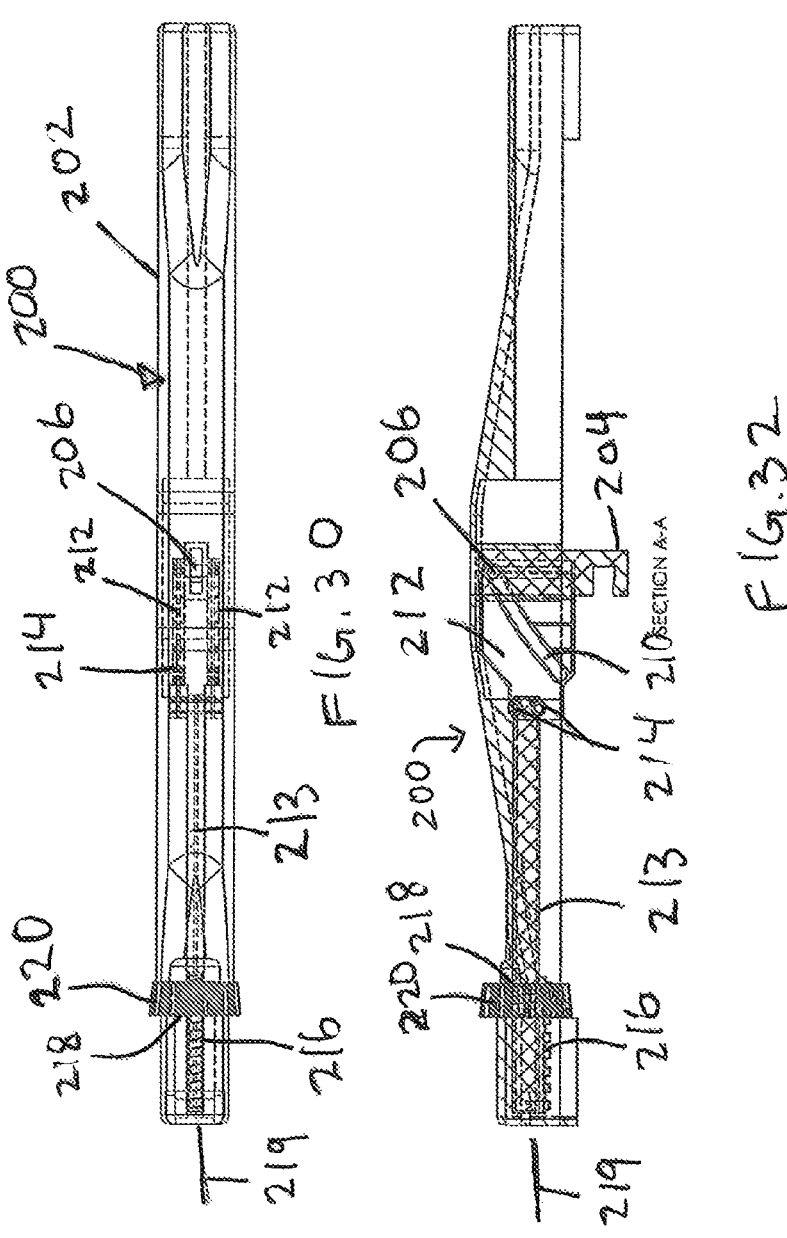
FIG.30
FIG.32

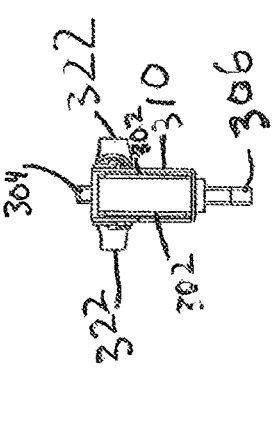
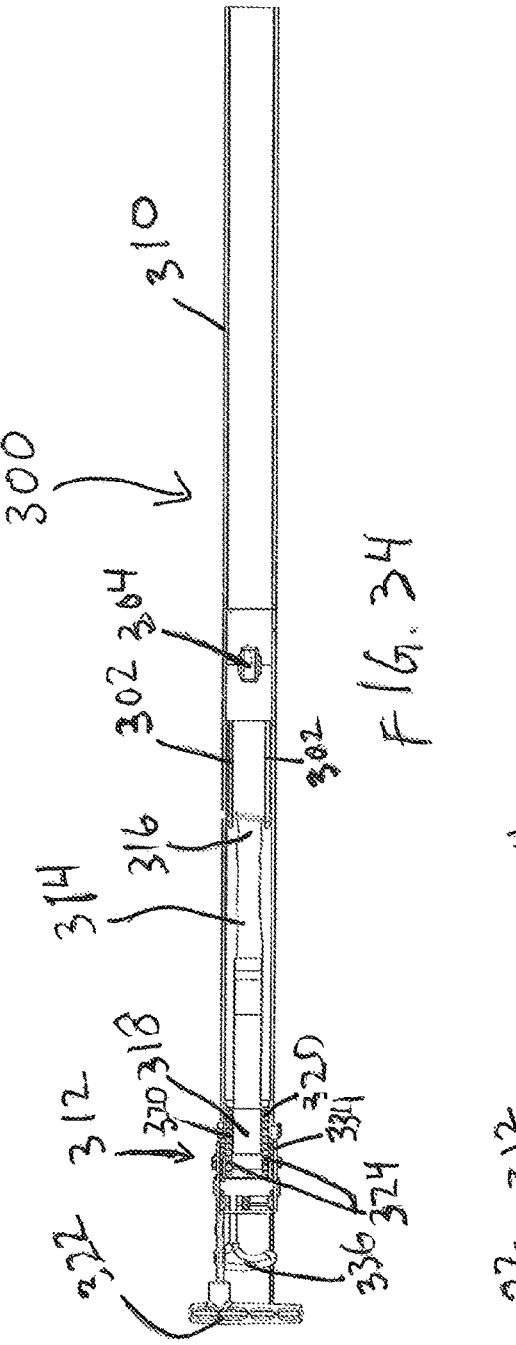
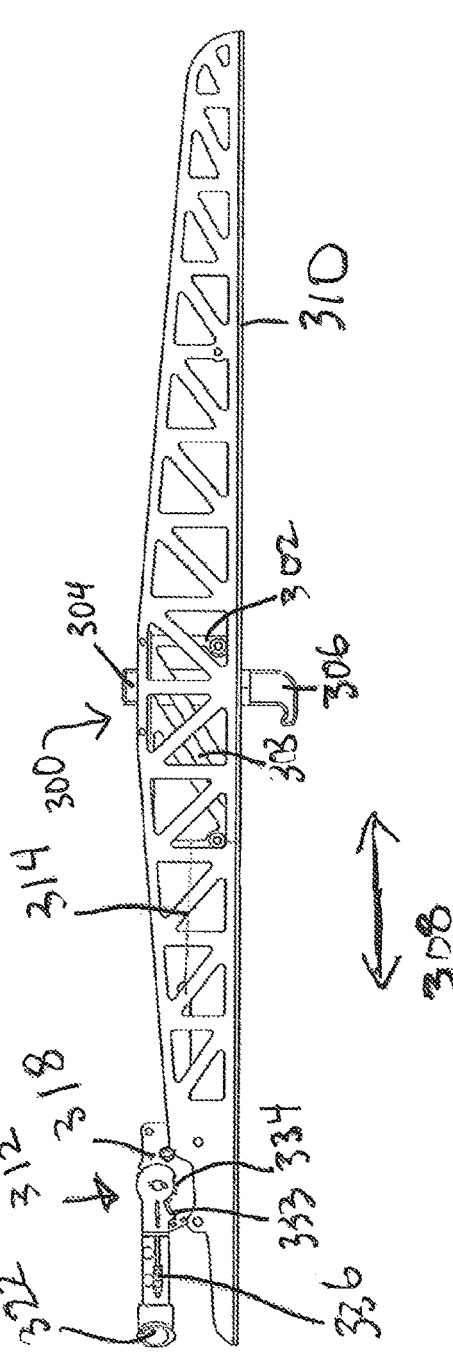
FIG. 34

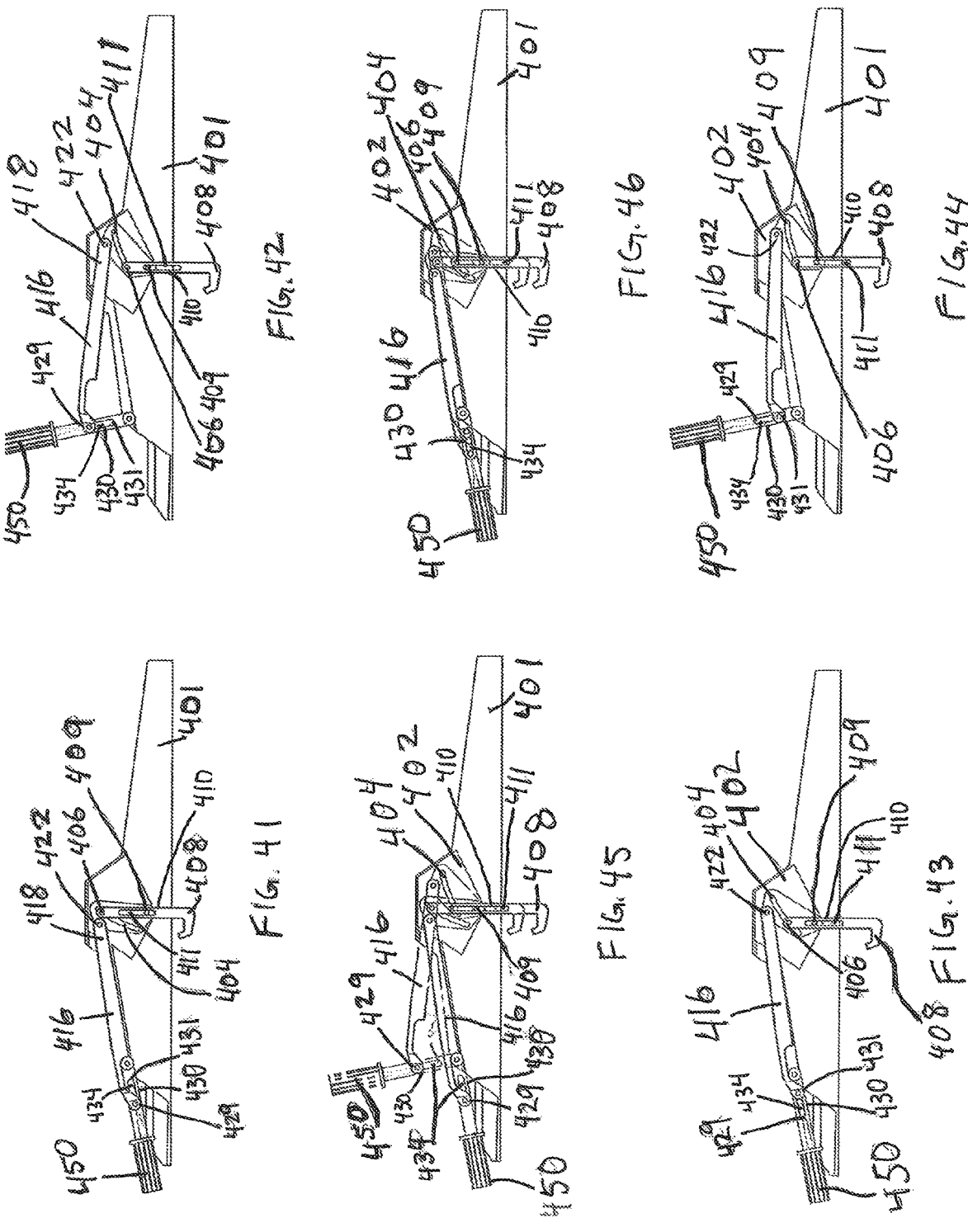

SNOWMOBILE SKI CLAMP

CROSS-REFERENCE TO RELATED APPLICATIONS

The present application claims priority from U.S. Provisional Application No. 63/421,791 filed on Nov. 2, 2022.

BACKGROUND

The present disclosure relates to clamp used to secure skis of a snowmobile to a bed of a vehicle or trailer. More particularly, the present disclosure relates to a clamp that applies a downward pressure onto a pair of skis of a snowmobile such that the skis are frictionally secured to the bed of the vehicle or trailer.

Many people enjoy riding snowmobiles on snow packed trails and other outdoor venues. However, many people need to transport their snowmobiles to the trails or other outdoor venues. Typically, the snowmobiles are transported on beds of trucks, such as pickup trucks or flatbed trucks, snowmobile auxiliary truck bed decks, and/or open or enclosed trailers.

However, the beds are typically constructed of a hard material, such as steel, aluminum or wood. As the carbides of the skis engage the hard surface of the bed, the skis can slide laterally to the direction of travel which can make loading and unloading the snowmobile difficult. To address lateral sliding, guides can be attached to the bed which engage and direct the carbides of the skis as the snowmobile travels on the bed.

Once on the bed, the snowmobile needs to be secured in place to prevent the snowmobile from moving while in transit. In some instances, rachet straps can be used to retain snowmobiles to the bed. However, multiple rachet straps are typically required to secure a snowmobile in place, which requires a significant amount of time and effort.

As such, there is a need for a clamp that can quickly secure the snowmobile to a bed. Also, there is a need for a clamp that can secure the skis of the snowmobile to the bed where the clamp can be adjusted and manipulated from an edge of the bed and typically while standing on the ground.

SUMMARY

An aspect of the present disclosure relates to a clamp for securing a pair of snowmobile skis to a bed having an attached loop. The clamp includes a main body comprising spaced apart plates configured to provide rigidity to the clamp and a hook. The clamp includes at least one moveable plate within the main body having a camming surface engaged with the hook, and an actuating mechanism proximate an end of the main body. The actuating mechanism is configured to position the clamp into an unclamped position wherein the hook is disengaged from the loop attached to the bed and a clamped position where the hook engages the loop and is configured to apply a downward force on the skis by moving the at least one actuator plate within the main body to raise the hook through engagement with the camming surface.

Another aspect of the present disclosure relates to a clamp for securing a pair of snowmobile skis to a bed having an attached loop. The clamp includes a main body comprising spaced apart plates configured to provide rigidity to the clamp, a hook and at least one plate pivotally attached to the main body at a first pivotal attachment, wherein the hook is attached to the at least one plate at an attachment location a distance from the first pivotal attachment. The clamp includes an actuating mechanism having an engaging end for user proximate an end of the main body wherein the actuating mechanism is pivotally attached to the plate at a second pivotal attachment. The second pivotal attachment is spaced from the first pivotal attachment and the attachment location, the actuating mechanism configured to pivot about the first pivotal attachment to position the clamp into an unclamped position wherein the hook is disengaged from the loop attached to the bed and to pivot about the first pivotal attachment to position the clamp into a clamped position where the hook engages the loop and is configured to apply a downward force on the skis by moving the at least one actuator plate within the main body to raise the hook through pivotal movement about the first pivotal attachment.

BRIEF DESCRIPTION OF THE DRAWINGS

FIG. 5 is a side view of the clamp in the open position.

FIG. 6 is a top view of the clamp in the open position.

FIG. 7 is a front view of the clamp in the open position.

FIG. 30 is a top view of the third clamp with the actuating mechanism illustrated in dashed lines.

FIG. 31 is an end view of the third clamp with the actuating mechanism illustrated in dashed lines.

FIG. 32 is a sectional taken along section line A-A as illustrated in FIG. 31.

FIG. 34 is a top view of the fourth clamp.

FIG. 41 is a view of the fifth clamp configured for a maximum stroke movement in the clamping position.

FIG. 42 is a view of the fifth clamp configured for a maximum stroke movement in the unclamped position.

FIG. 43 is a view of the fifth clamp configured for a minimum stroke movement in the unclamped position.

FIG. 44 is a view of the fifth clamp configured for a minimum stroke movement in the clamping position.

FIG. 45 is a view of the fifth clamp being positioned between a minimum stroke movement and a maximum stroke movement in the unclamped position.

FIG. 46 is a view of the fifth clamp being positioned between a minimum stroke movement and a maximum stroke movement in the clamping position.

DETAILED DESCRIPTION

Figure 1:
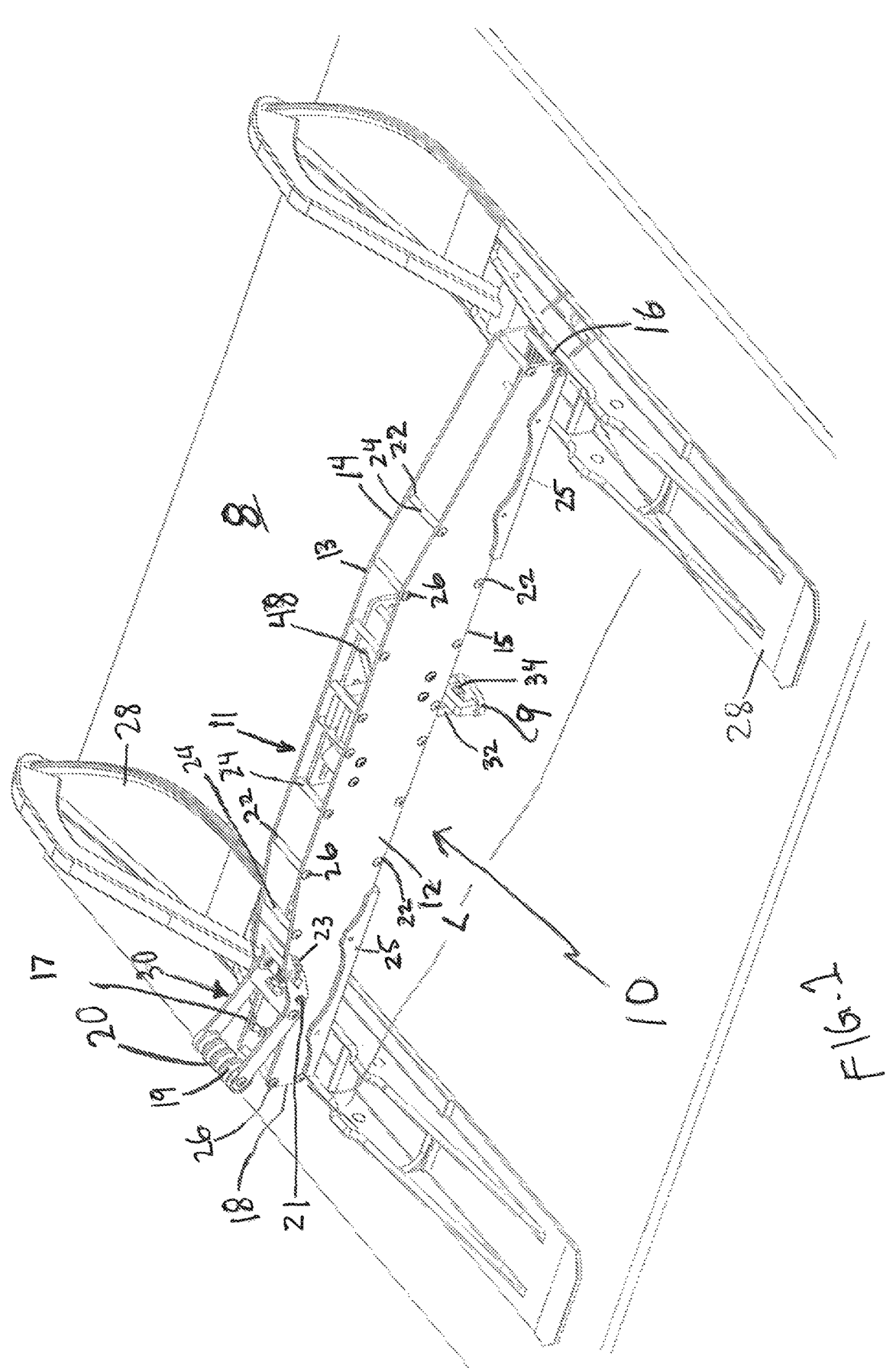
FIG. 1 is view of a pair of skis secured to a bed with a clamp.
Figure 2:
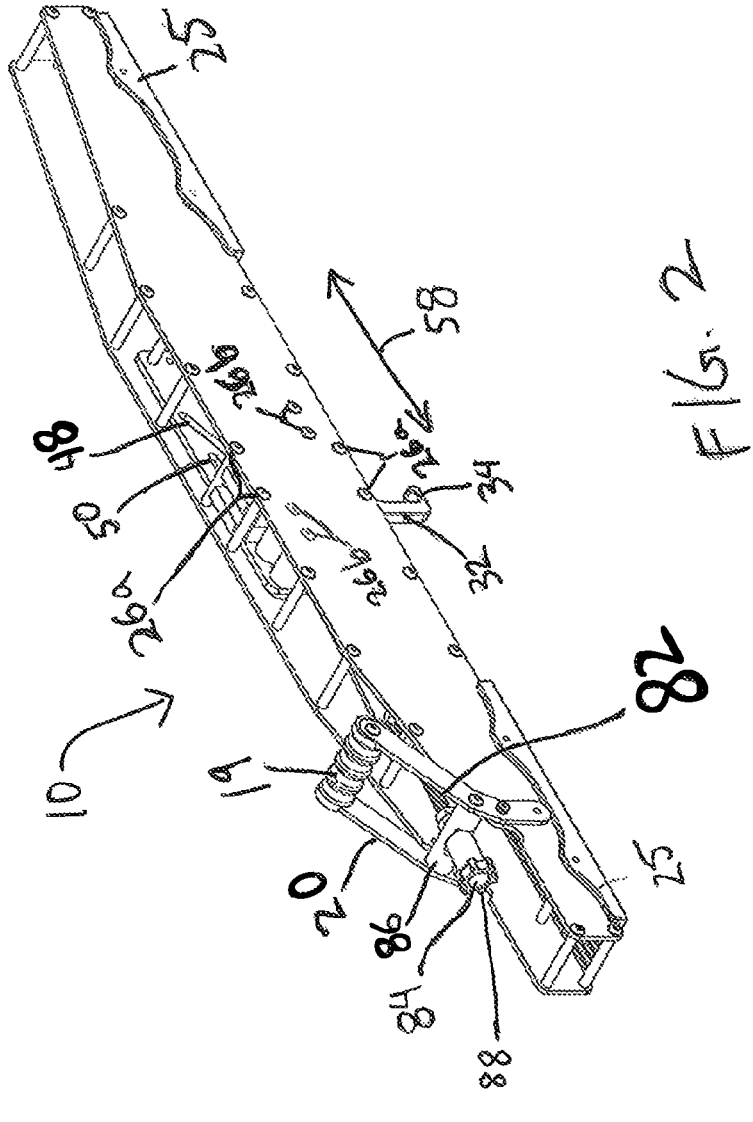
FIG. 2 is a view of the clamp in the open position.
Figure 3:
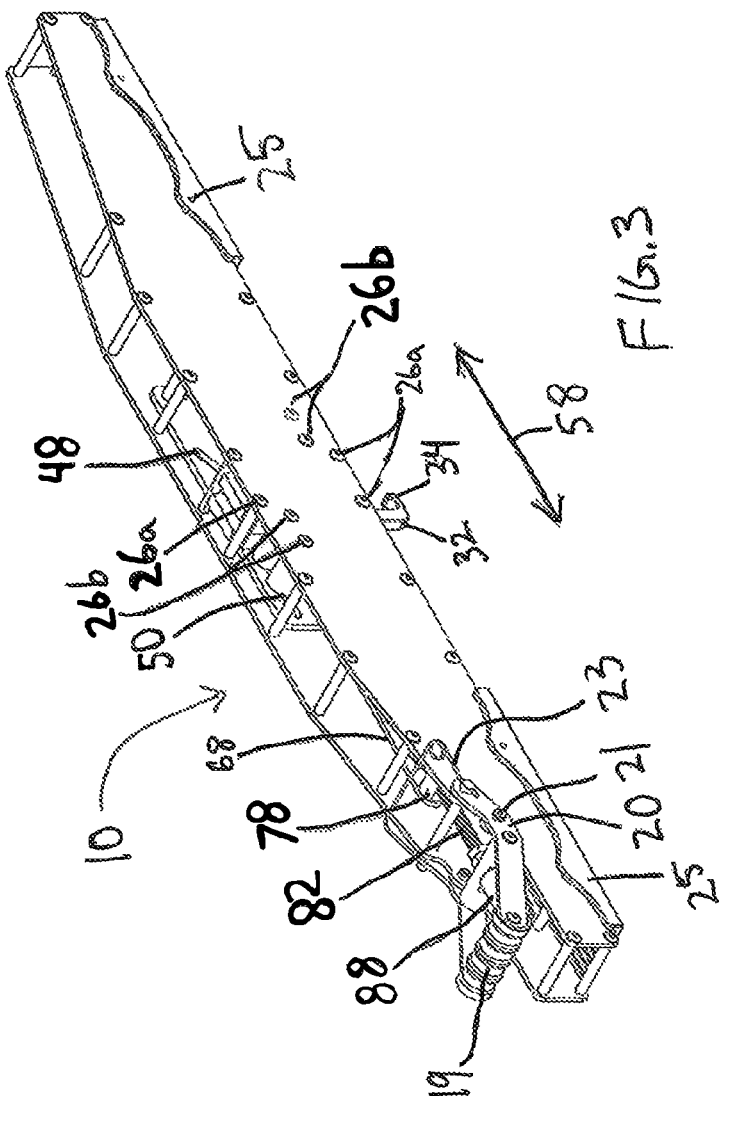
FIG. 3 is a view of the clamp in the closed position.
Figure 4:
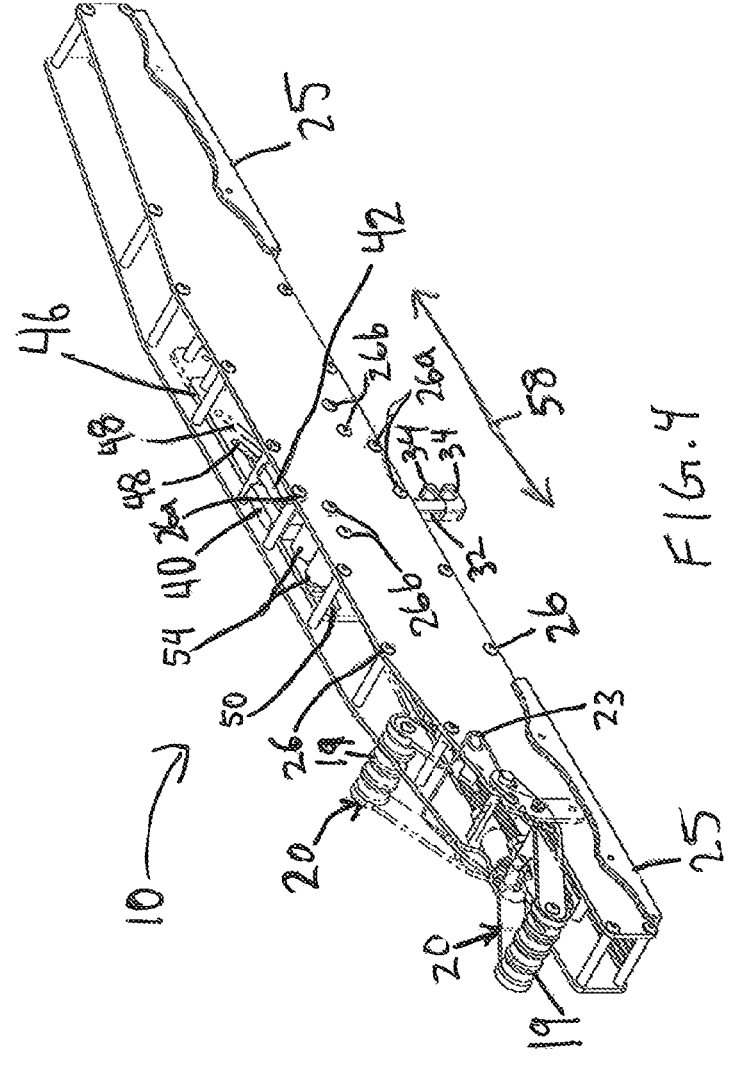
FIG. 4 is a view of the clamp moving from the closed position to the open position.
Figure 10:
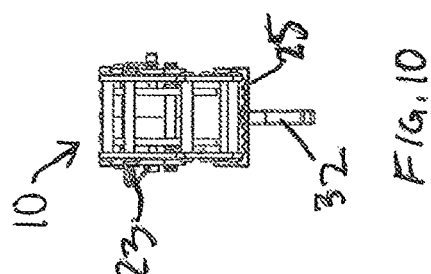
FIG. 10 is a front view of the clamp in the closed position.
Figure 9:
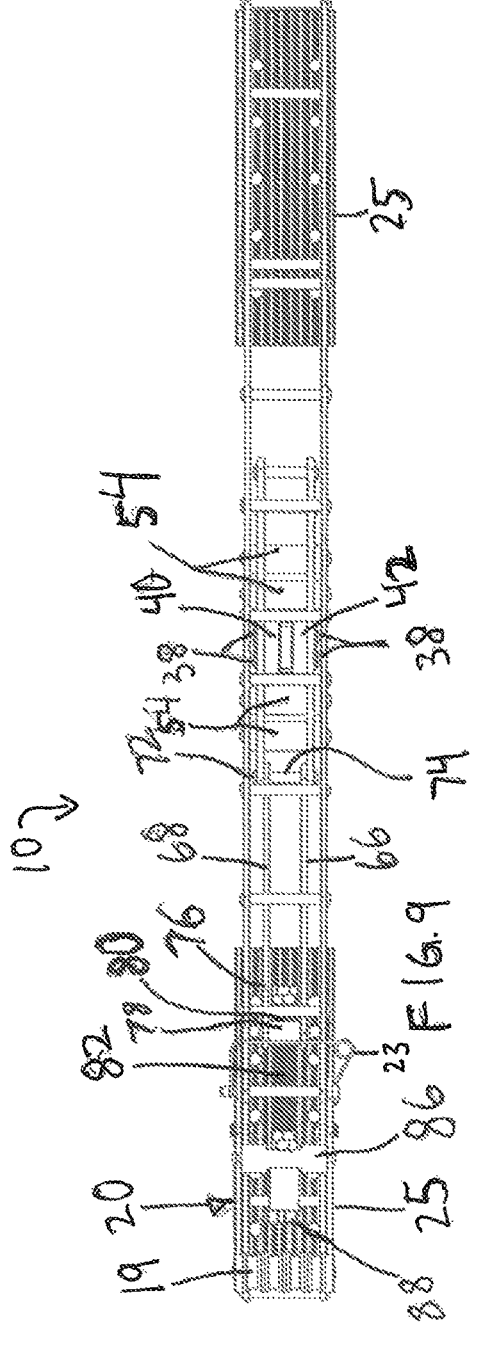
FIG. 9 is a top view of the clamp in the closed position.
Figure 8:
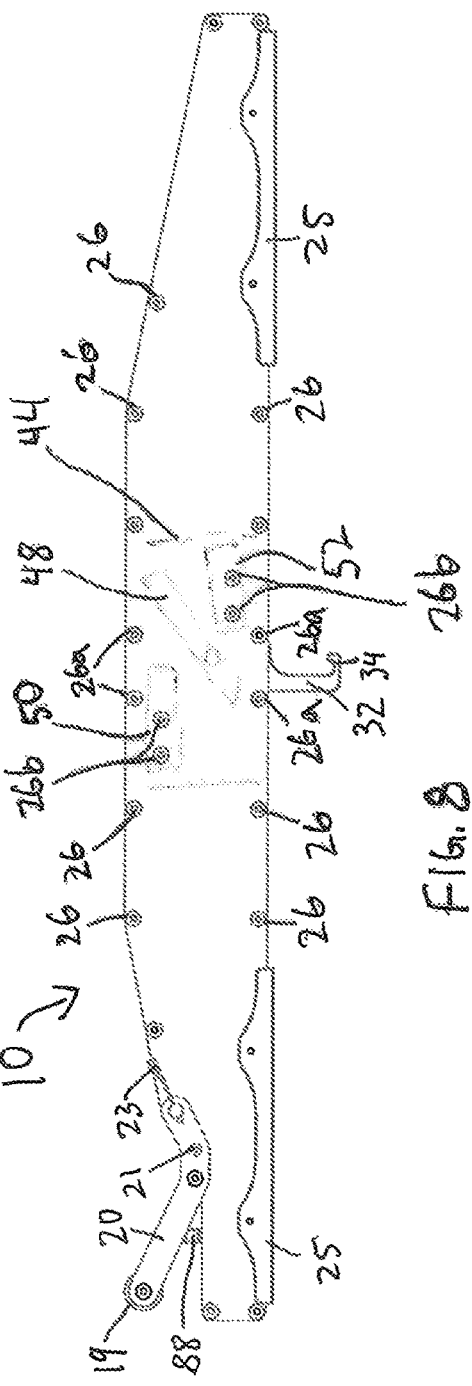
FIG. 8 is a side view of the clamp in the closed position.
Figures 11, 12, 13:
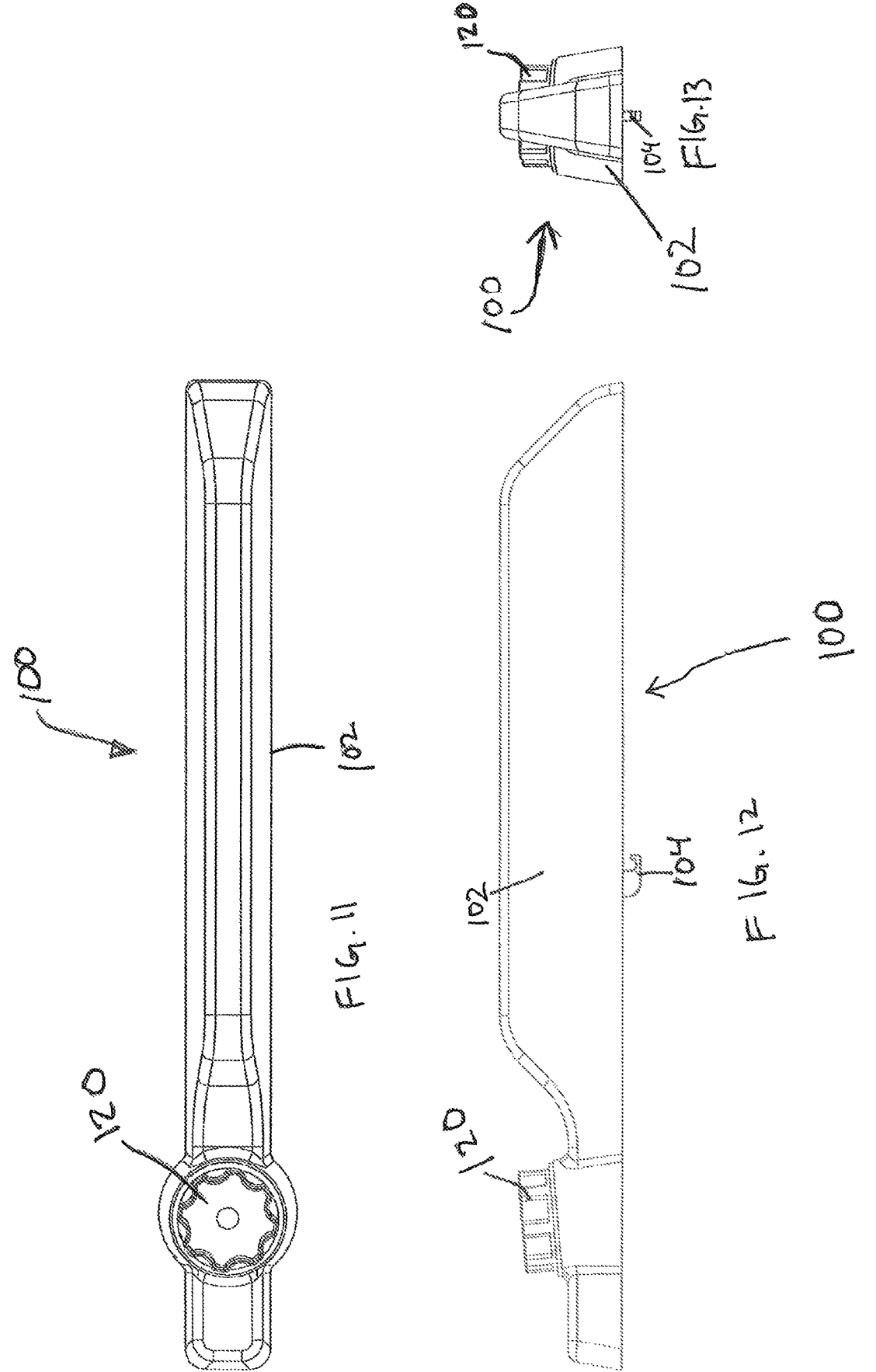
FIG. 11 is top view of a second clamp for clamping a pair of skis.
FIG. 12 is a side view of the second clamp.
FIG. 13 is a back view of the second clamp.
Figures 14, 15, 16:
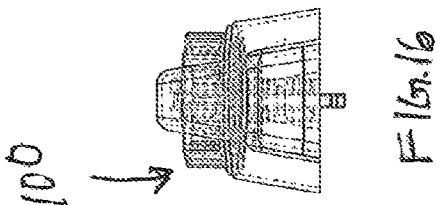
FIG. 14 is a top view of the second clamp showing the actuating mechanism with dashed lines.
FIG. 15 is a sideview of the second clamp showing the actuating mechanism with dashed lines.
FIG. 16 is a back view of the second clamp showing the actuating mechanism with dashed lines.
Figures 17, 18, 19, 20, 21, 22:
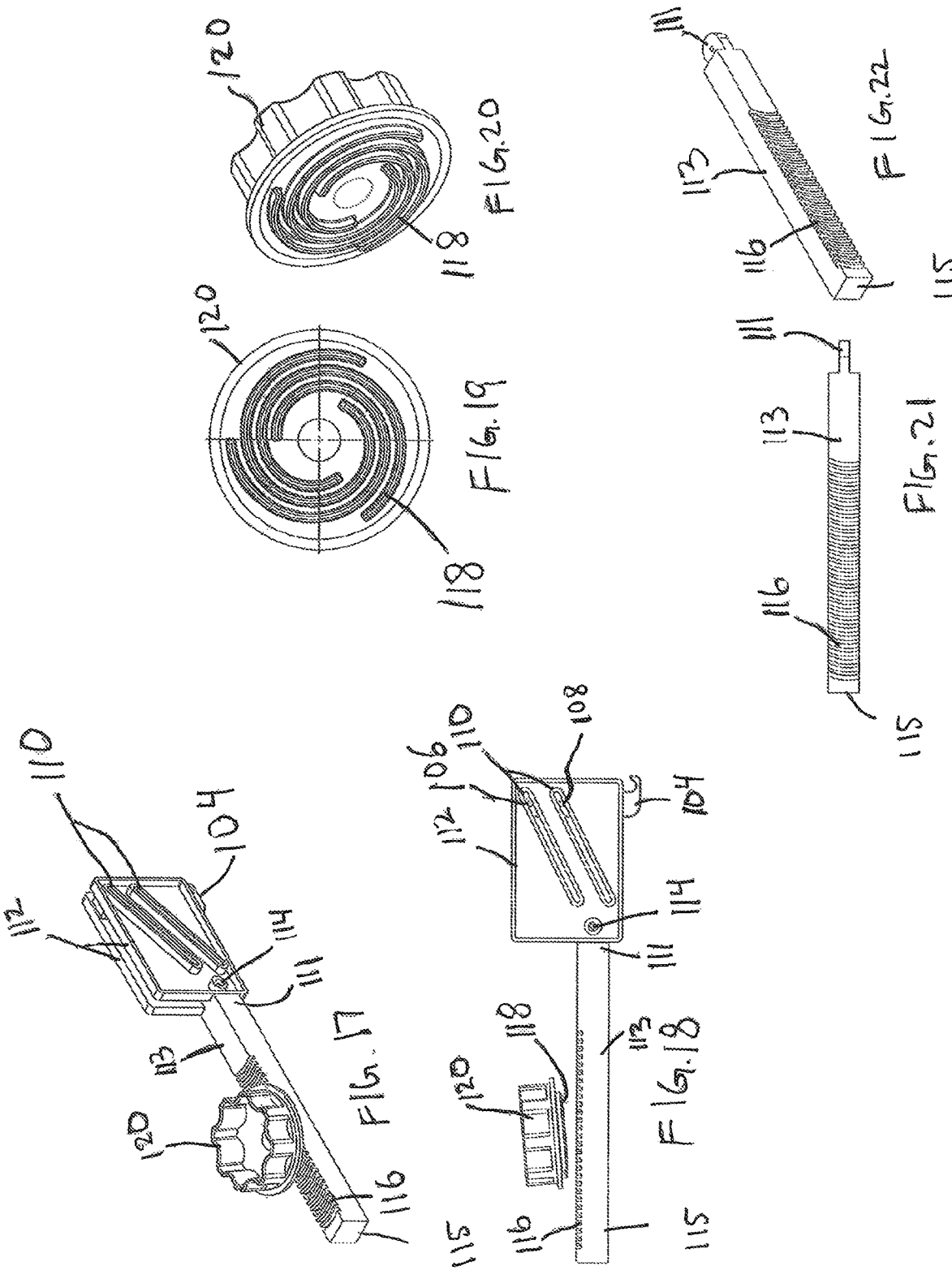
FIG. 17 is a view of the actuating mechanism of the second clamp.
FIG. 18 is a partial exploded view of the actuating mechanism of the second clamp.
FIG. 19 is a front view of the spiral gear of the actuating mechanism of the second clamp.
FIG. 20 is a view of the actuator grip with the spiral gear.
FIG. 21 is top view of the pinion of the actuating mechanism of the second clamp.
FIG. 22 is another view of the pinion of the actuating mechanism of the second clamp.
Figure 23:
FIG. 23 is a view of a third clamp securing a pair of snowmobile skis to a bed.
Figures 24, 25:
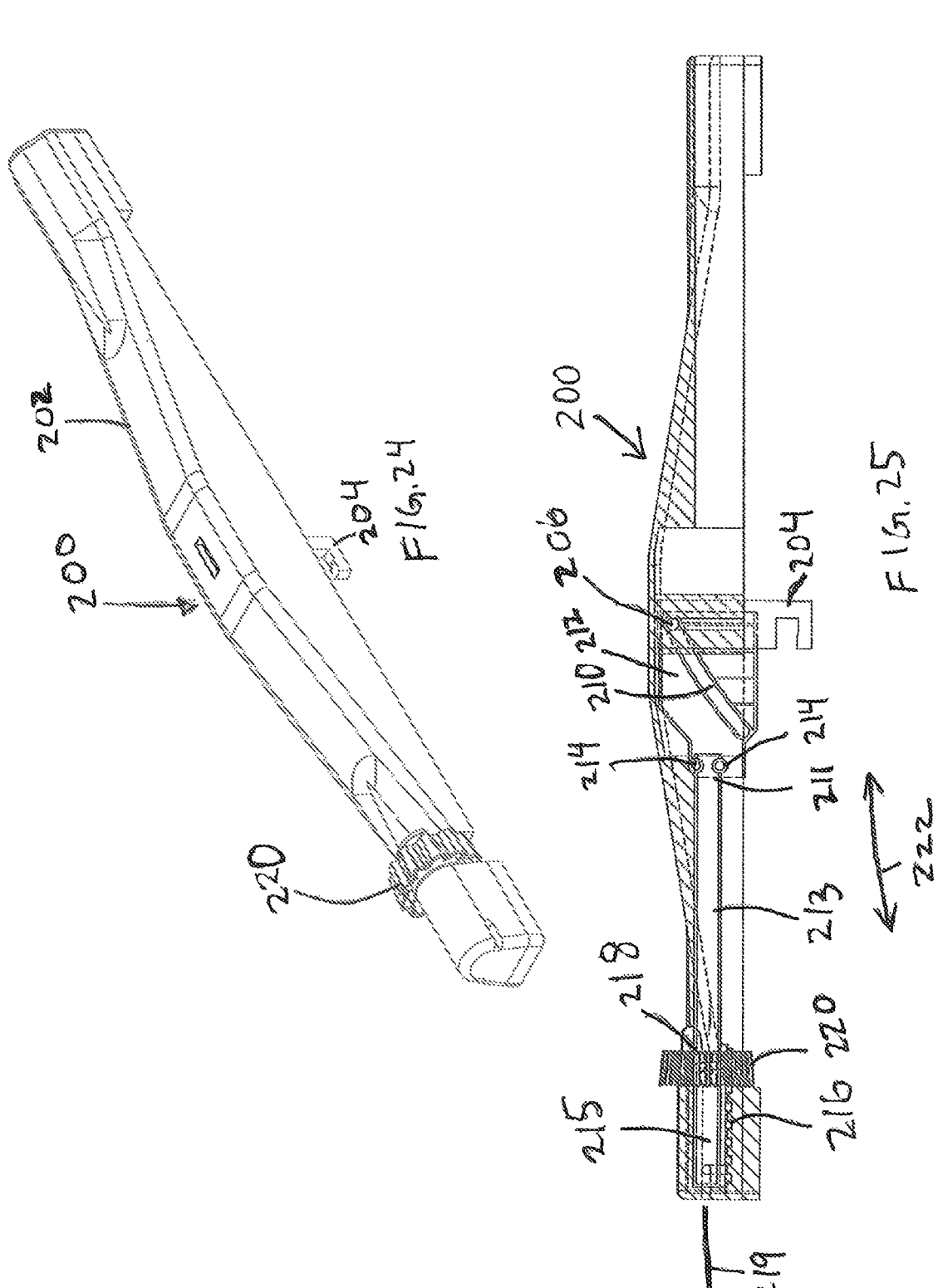
FIG. 24 is a view of the third clamp in a clamping position.
FIG. 25 is a sectional view of the third clamp illustrated in FIG. 24.
Figures 26, 27:
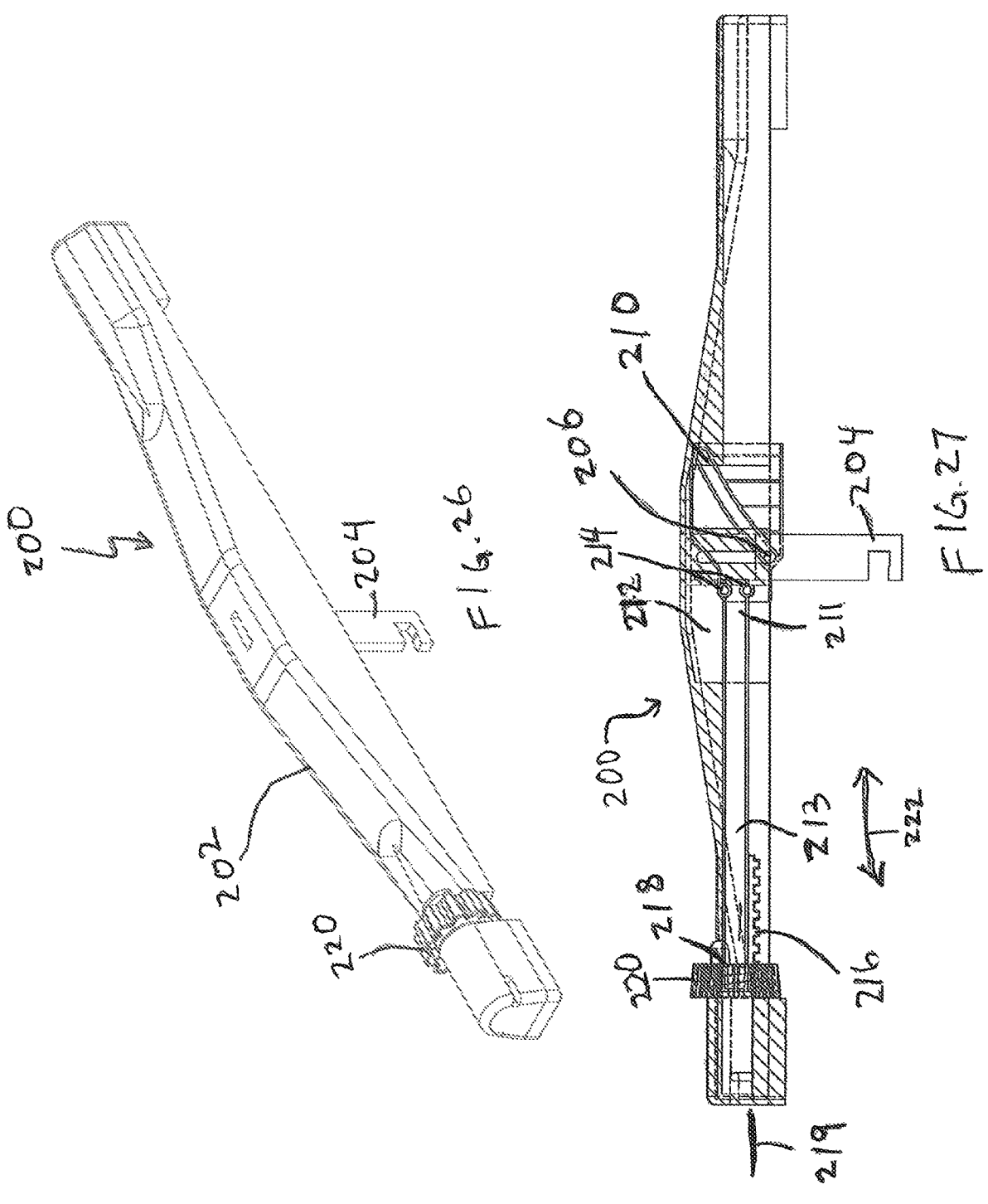
FIG. 26 is a view of the third clamp in a non-clamping position.
FIG. 27 is a sectional view of the third clamp illustrated in FIG. 26.
Figures 28, 29:
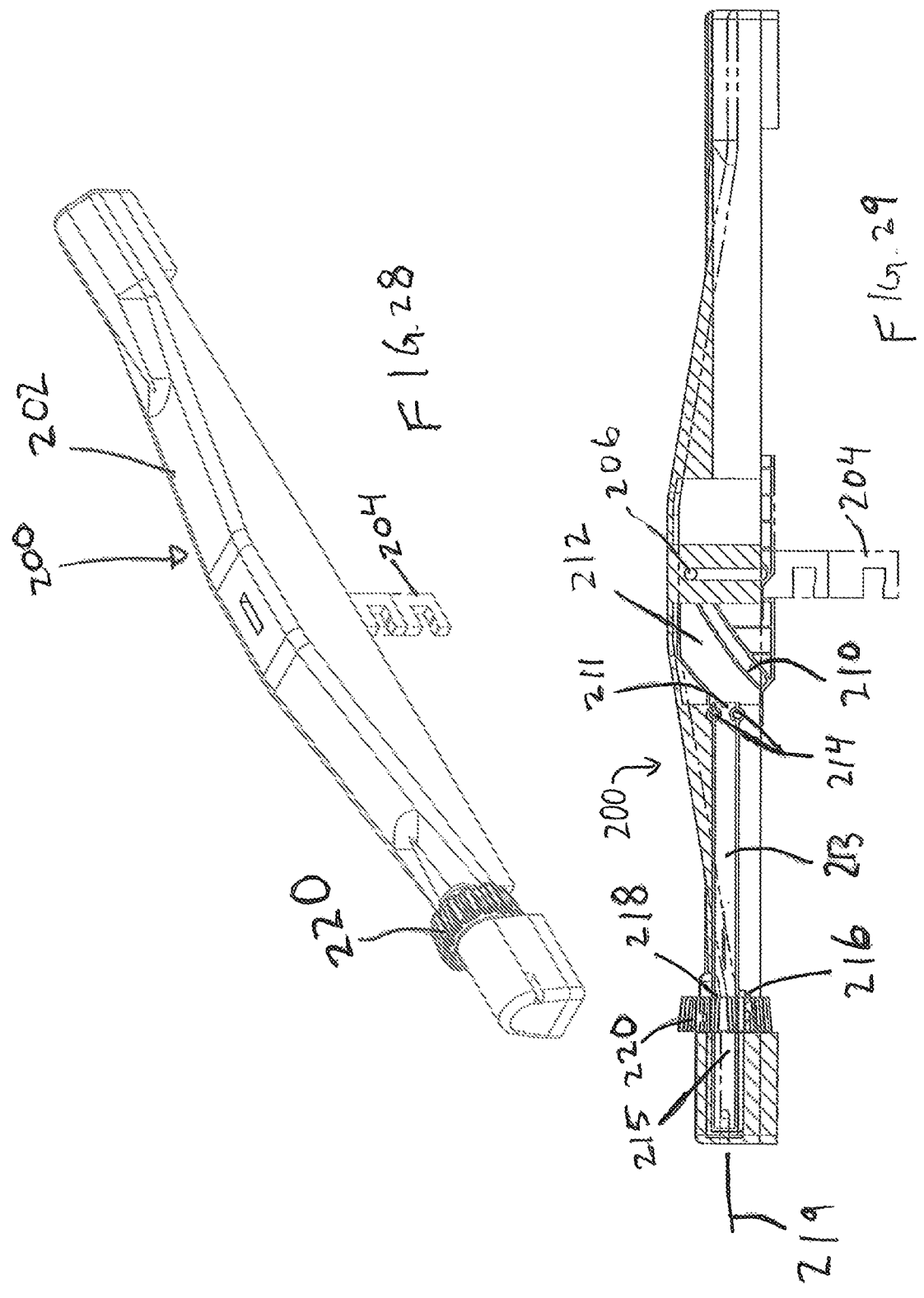
FIG. 28 is an illustration of the second clamp moving between the non-clamping and clamping position.
FIG. 29 is a sectional view of the third clamp illustrated in FIG. 28.

A clamp for securing a pair of snowmobile skis to a bed 8 of a truck, such as pickup truck or flatbed truck, a snowmobile auxiliary truck bed deck, and/or an open or enclosed trailer is illustrated in FIG. 1 at 10. The clamp 10 is configured to engage an anchor 9 in the bed 10 and has a main body 11 with length L that such that opposing ends of the main body 11 are positionable over the skis of the snowmobile. The clamp is positionable between a first, unclamped position, as illustrated in FIG. 2, where the clamp and skis can move relative to each other and a second, clamping position, as illustrated in FIG. 3 where the clamp places a downward force on the skis such that the skis are frictionally secured between the clamp and the bed.

The clamp includes an actuator and a force adjusting mechanism, both of which are actuated from proximate an end of a main body. With the actuator and force adjusting mechanism located proximate an end of the main body, the user can stand on the ground or proximate an edge of the bed and manipulate the actuator to position the clamp in the first, non-clamping position and the second clamping position. The user can also manipulate the force adjusting mechanism from ground level or proximate an edge of the bed such that a selected amount of force is imparted on the skis in the second, clamping position to ensure the snowmobile is retained to the bed with a frictional engagement.

Referring to FIGS. 1-10, the clamp 10 includes the main body 11 with front and back plates 12 and 14 that are similarly constructed and include distal ends 16 and proximal ends 18. An actuating handle 20 and a force adjusting mechanism 17 are located proximate the proximal end 18, such that the actuating handle 20 and the force adjusting mechanism 17 can be accessed and manipulated by a user from ground level or an edge of the bed.

The front and back plates 12 and 14 include a plurality of aligned apertures 22 proximate top and bottom edges 13 and 15 of the front and back plates 12 and 14, where a plurality of spacers 24 with through bores are aligned with the plurality of apertures 22. With the plurality of spacers 24 aligned with the plurality of apertures 22, rivets 26 are used to secure the front and back plates 12 and 14 together at a selected distance D which is substantially equal to the length of each of the plurality of spacers 24. While rivets 26 are disclosed and illustrated, other securing mechanism can be utilized, including but not limited to threaded bolts and nuts, pins with clips or cotter pins and/or pins with camming members.

With the rivets 26 securing the plurality of spacers 24 between the front and back plates 12 and 14, the main body 11 is substantially rigid and can withstand the forces imparted upon the skis of the snowmobile without substantially bending or flexing. The components of the main body 11 can be constructed of metals such as aluminum and steel, plastics or combinations thereof.

The actuator 30 includes the hook 32 having an end 34 configured to engage a loop secured to the bed between a pair of skis of the snowmobile. An upper end 36 of the hook 32 include a plurality of pins 38 having ends that extend from opposing sides. The pins 38 extend through vertical slots in guide blocks 40 and 42, where movement of the guide blocks 40 and 42 are prevented from substantially movement by the rivets 26*a* and spacers 24*a* located on either side proximate the lower and upper ends of the guide blocks 40 and 42.

The actuator 30 includes front and back actuator plates 44 and 46 having a slanted camming slot 48 through which the pins 38 extend. As the front and back actuator plates 44 and 46 are moved in the direction of arrows 58 toward the distal ends 16 or proximal ends 18 of the main body 11, the pins 38 change elevation through engagement with the slanted, camming slot 48 which causes the end 34 of the hook 32 to move and engage the loop secured to the bed resulting in a clamping force being applied to the skis or release the skis.

The front and back actuator plates 44 and 46 include proximal slots 50 and distal slots 52 at different elevations and on opposite sides of the hook 32, such that the slots 50 and 52 do not intersect or interfere with the slanted, camming slot 48. Spacers 54 are positioned between the front and back actuator plates 44 and 46 and rivets 26*b* are positioned through apertures in the plates 12 and 14, the proximal slots 50 in the actuator plates 44 and 46 and the spacers 54. Spacers 54 are positioned between the front and back actuator plates 44 and 46 and rivets 26*b* are positioned through apertures in the plates 12 and 14, the distal slots 52 and the spacers 54 to retain a selected spacing between the front and back actuator plates 44 and 46 to allow for lateral movement in the direction of arrow 58 while preventing vertical movement relative to the main body 11.

A spacer 60 is positioned between the front and back actuator plates 44 and 46 and secured with a rivet that extends through the front and back actuator plates 44 and 46 but does not extend through the front and back plates 12 and 14. The spacer 60 and rivet provide structural integrity to front and back actuator plates 44 and 46 proximate distal ends 62.

Distal ends 70 of front and back linking plates 66 and 68 are attached to the front and back actuator plates 44 and 46 proximate proximal ends 64 with a rivet 72 where a spacer 74 retains a gap between the front and back linking plates 66 and 68. Proximal ends 76 of the front and back linking plates 66 and 68 are spaced apart with a block 78 that is secured therebetween. The block 78 includes a threaded bore 80 that threadably engages a threaded shaft 82. A proximal end 84 of the threaded shaft 82 extends through a bore in a brace 86 for the actuating handle 20. A knob 88 is secured to the proximal end 84, such that as the knob 88 is rotated, the threaded shaft 82 rotates and engages the threaded bore 80 which causes the length of the shaft between the brace 86 and the block 78. As the length of the threaded shaft 82 changes, the front and back actuator plates 44 and 46 slide about the rivets 26c and the pins 38 travel along the slanted slot 48 which causes the elevation of the hook 32 to change. Changing the elevation of the hook 32 relative to main body 11 adjusts the force imparted on the skis when the clamp 10 is in the second, clamping position.

The clamp 10 is positioned into the first, unclamped position and the second clamped position by gripping a grip 19 and rotating the actuator handle 20 about a pivot pin 21 towards the proximal ends 18 of the front and back plates 12 and 14. As the actuator handle 20 is rotated about the pivot pin 21, the brace 86 engages the knob 88 and pulls the threaded shaft 82, the linking plates 66 and 68 and the front and back actuator plates 44 and 46 to move toward the proximal ends 18 of the front and back plates 12 and 14. As the actuator plates 44 and 46 move toward the proximal ends 18, the pins 38 travel up the slanted slot 48, resulting in the end 34 of the hook 32 to engage the loop secured to the bed and apply a clamping force to the skis. The actuator handle 20 is continued to be rotated about the pivot pin 21 until the brace 86 engages the front and back plates 12 and 14 having indentions to receive the brace 86. The clamp 10 includes pads 25 that engage the skis 28 and prevent damage to the skis 28 while the clamp 10 is in the clamping position.

The actuator handle 20 is retained in the second position because the actuator handle 20 has an over center toggle that requires manual force in an opposite direction to place the actuator handle in the raised position which allows the pins 38 to move downward in the slanted slots 48, which in turn releases the pressure on the skis. A torsion spring 23 engages the actuator handle 20 and aids in biasing the actuator handle 20 into the first, unclamped position.

Referring to FIGS. 11-22, another clamp is illustrated at 100 where the members of the clamp 100 are substantially the same as the clamp 10. However, the force adjusting mechanism and the actuator are different from the over center toggle of the actuator handle 20 and the manipulation of the threaded shaft 82.

The clamp 100 includes an actuator grip 120 that is external to the main body 102. The clamp 100 includes the hook 104 with pins 106 and 108 that engage slanted, camming slots 110 in actuator plates 112 such that as the actuator plates 112 move, the elevation of the hook 104 changes due to the pins 106 and 108 engaging the slanted slots 110.

A proximal end 111 of a substantially rigid member 113 is pivotally attached to the actuator plates 112 with a rivet 114 such the substantially rigid member 113 can pivot relative to the actuator plates 112. A distal end 115 of the substantially rigid member 113 includes a pinion 116 that engages a spiral gear 118 that is moved by the actuator grip 120.

As the actuator grip 120 is rotated about a pivot axis the spiral gear 118 engages the pinion 116 causing the substantially rigid member 113 and the actuator plates 112 to move in direction of arrows 122, which in turn causes the pins 106 and 108 to move along the slanted camming slots 110 and raise and lower the hook into and out of the clamping position. The interaction of the spiral gear 118 with the pinion 116 does not place back pressure on the pinion 116, such that there is substantially no unwanted movement of the spiral gear 118 while in use. The main body 102 is typically enclosed to prevent debris from interfering with interaction of the pinion 116 and the spiral gear 118.

Referring to FIGS. 23-32, another clamp is illustrated at 200 where the members of the clamp 200 are substantially the same as the clamps 10 and 100. However, the force adjusting mechanism and the actuator are different from the over center toggle of the actuator handle 20 and the manipulation of the threaded shaft 82.

The clamp 200 includes an actuator grip 220 that is accessible from to the main body 202. The clamp 200 includes the hook 204 with pin 206 that engage a slanted, camming slot 210 in actuator plates 212 such that as the actuator plates 212 move, the elevation of the hook 204 changes due to the pins 206 engaging the slanted slot 210 as best illustrated in FIGS. 24-29.

A proximal end 211 of a substantially rigid member 213 is pivotally attached to the actuator plates 212 with rivets 214 such the substantially rigid member 213 is retained to the actuator plates 212. A distal end 215 of the substantially rigid member 213 includes a threaded region 216 that engages threaded surface 218 that is moved by the actuator grip 220.

As the actuator grip 220 is rotated about a pivot axis 219, the threaded surface 218 engages the threaded region 216, causing the substantially rigid member 213 and the actuator plates 212 to move in direction of arrows 222, which in turn causes the pin 206 to move along the slanted slot 210 and raise and lower the hook 204 into and out of the clamping position. The main body 202 is typically substantially enclosed to prevent debris from interfering with interaction of the threaded surface 218 and the threaded region 216.

Figure 33:
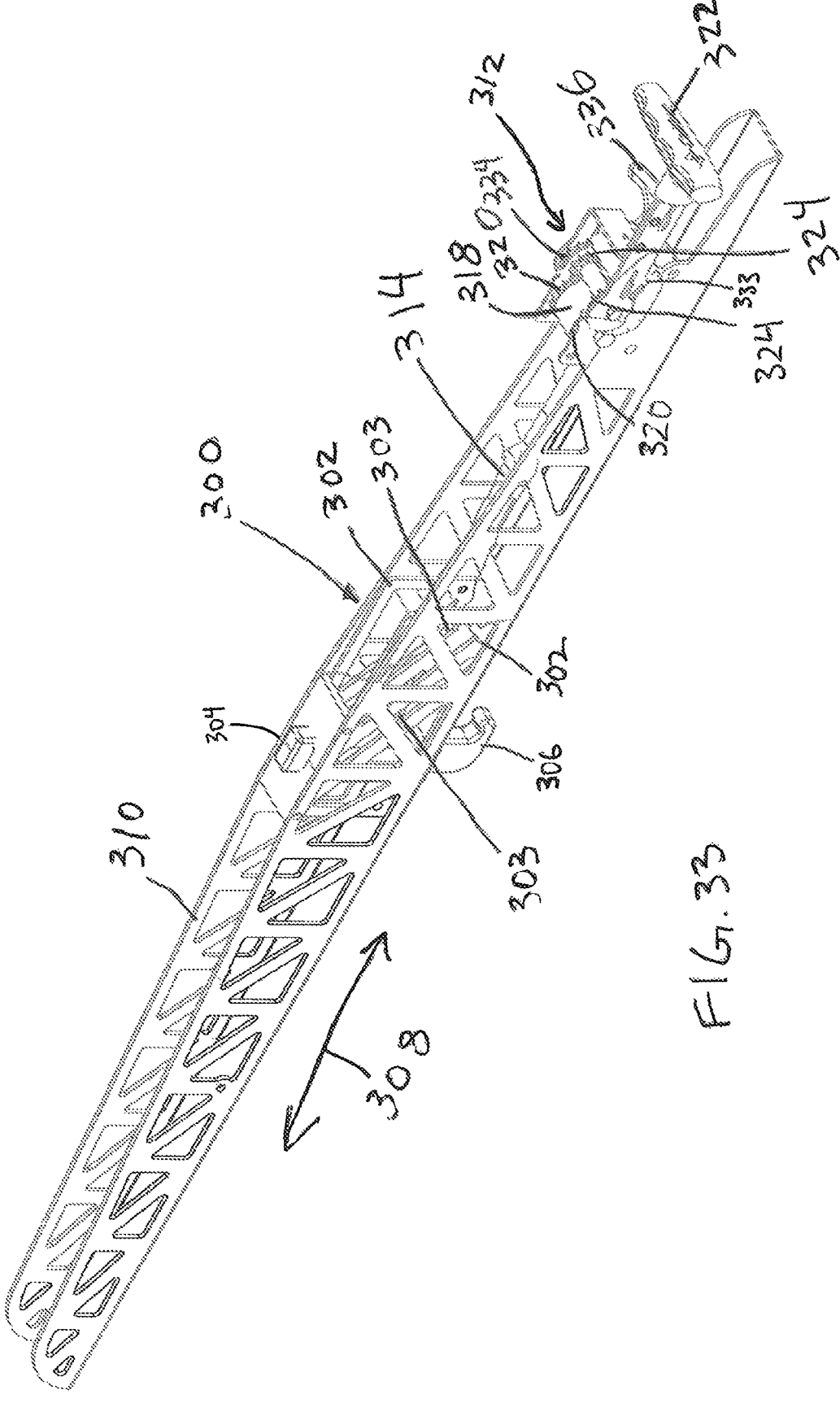
FIG. 33 is a view of a fourth clamp for securing a pair of skis.
Figures 35, 36, 37:
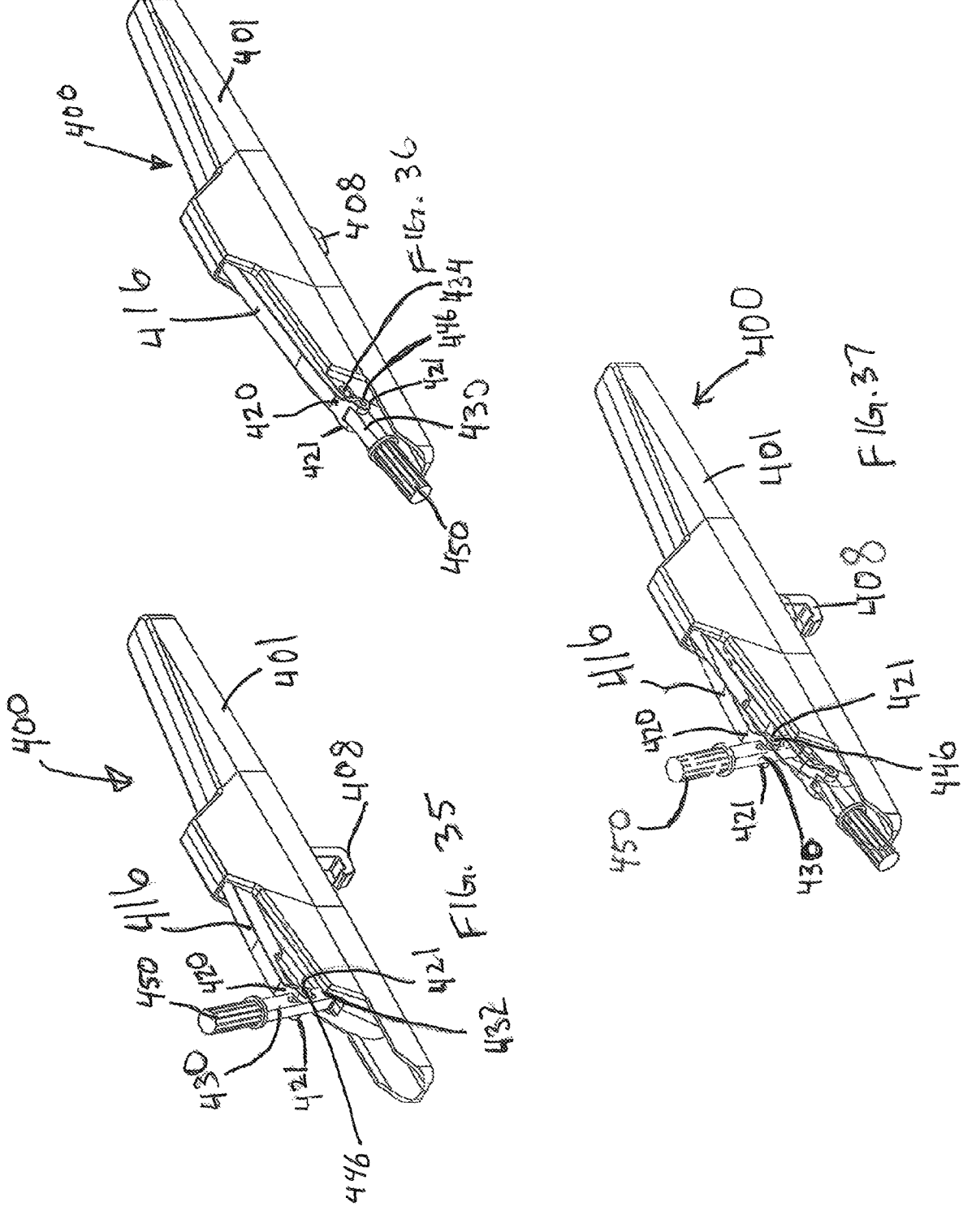
FIG. 35 is a view of a fifth clamp in an unclamped position.
FIG. 36 is a view of the fifth clamp in the clamping position.
FIG. 37 is a view of the fifth clamp moving between the clamping and the unclamping position.
Figures 38, 39, 40:
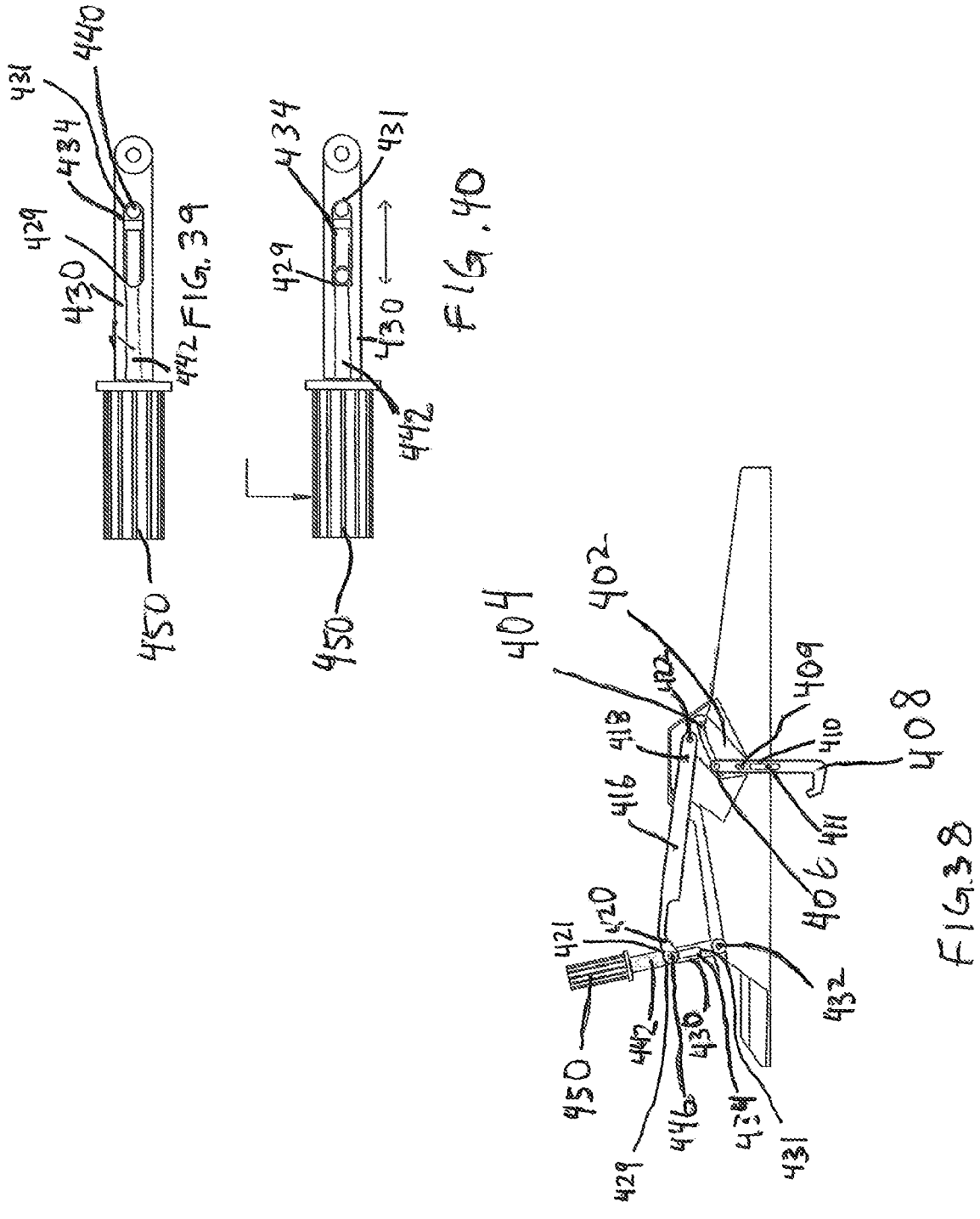
FIG. 38 is a cutaway view of the fifth clamp in the unclamped position.
FIG. 39 is a view of a tensioning mechanism for the fifth clamp in a minimum stroke position.
FIG. 40 is a view of the tensioning mechanism for the fifth clamp moving to the maximum stroke position.

Referring to FIGS. 33-34, another clamp is illustrated at 300. The clamp 300 includes the actuator plates 302 having slanted, camming slots 303 that engage a pin 304 in a hook 306, such that as the actuator plates 302 move in the direction of arrows 308, an elevation of the hook 306 relative to the main body 310 changes due to the pin 304 traveling upward along the slanted slot 303 to position the clamp 300 in the first, non-clamping position and the second clamping position.

The clamp 300 includes an actuating mechanism 312 that includes a strap 314 where a distal end 316 is secured to the actuator plates 302 and another end is coiled in a spool 318 having gears 320 about side edges. The actuating mechanism 312 includes a tensioning handle 322 that includes gears 324 that mesh with the gears 320 on the spool 318. As the tensioning handle 322 is raised, the strap 314 is coiled about the spool 318 which causes the actuator plates 302 to move and cause the pin 304 to travel up the slanted slots 303 and the hook 306 to raise. The tensioning handle 322 includes a pawl 333 that engages a gear 334 which allows the tensioning handle 322 to be lowered and then re-engage the gear 334 to collect more of the strap 314 on the spool 318 until the hook 306 is in the second, clamping position. To release the tension on the strap 314, a grip 336 attached to the pawl is pulled toward the tensioning handle 322 which disengages the pawl from the gear 334, which allows the strap to uncoil from the spool 318 to an un-tensioned stated which allows the hook 306 to lower into the unclamping position.

Referring to FIGS. 35-46, another clamp is illustrated at 400. The clamp 400 includes a main body 401 similar to the main body of the clamps 10, 100, 200 and 300. However, the clamp 400 includes a different tensioning mechanism and actuator handle that raises and lowers a hook. The clamp 400 includes spaced apart camming plates 402 that include aligned arcuate camming slot 404 that supports a pin 406 extending from an upper end of a hook 408. The hook 408 includes a substantially straight shank 410 that includes a slot 411. Another pin 409 extends from the plates 402 and through the slot 411 to prevent rotational movement of the hook 408 while allowing for substantially lateral and vertical movement.

A distal end 418 of a linkage arm 416 is pivotally attached to the camming plates 402 with a pin 422. A proximal end 420 of the linkage arm 416 includes spaced apart tabs 421 having apertures, where the spaced apart tabs 421 are configured to be positioned about an actuating lever 430. The actuating lever 430 is pivotally attached to the main body with a pivot pin 432 such that the actuating lever 430 can be pivoted upwardly and downwardly. The actuating lever 430 includes a slot 434 into which an end 440 of a threaded shaft 442 is positioned. The end 440 includes a through bore that is aligned with the apertures in the spaced apart tabs 420 such that a pin 446 is inserted therethrough to pivotally attach the linkage arm 416 to the actuating lever 430.

The shaft 442 is positioned through a through bore in the actuating lever 430 where at least a portion of the through bore includes a threaded surface that threadably engages the threaded shaft. A grip 450 is non-rotatably secured to the threaded shaft 442 such that as the grip 450 is rotated the threaded engagement of the shaft 442 with the threaded surfaces causes the end 440 of the shaft 442 to move within the slot 434. Manipulation of the grip 450 and the location of the end 440 of the shaft 442 allows the stroke between the open, non-clamping position and the closed position to be customized to provide the necessary clamping force in the second, clamping position.

By way of example, when the end 440 is positioned in the slot 434 proximate the end 431, the stroke distance is minimized (FIGS. 43 and 44). When the end 440 is positioned in the slot 434 proximate the end 429, the stroke distance is maximized (FIGS. 41 and 42). The end 440 can be retained between the ends 429 and 431 to have a stroke between the minimum and the maximum (FIGS. 45 and 46).

Once the stroke distance is determined, the actuating lever 430 is rotated toward the clamp 400, which causes which causes movement of the linkage arm 416 which in turn causes the actuating plates 402 to rotate about the pin 422 and causes the pin 406 to move by engagement with the camming slot 402. The hook 408 is then raised to cause a frictional engagement with a pair of skis. To release the clamp 400 the actuating lever 430 is rotated about the pin 432 to a raised position, which reverses the prior action and places the clamp 400 in the non-clamping position.

In another embodiment, a clamp includes a hook is attached to at least one plate that is pivotally attached to a main body. An actuating mechanism is pivotally attached to the at least one plate a distance from the pivotal attachment of the plate to the main body. Due to the distance between the two pivotal attachments to the plate, as the actuating mechanism is manipulated, the plate pivots and raises the hook into the clamping position and lowers the hook into the unclamped position. Any of the disclosed actuating mechanism can be utilized with the clamp with the pivotal plate that causes movement of the hook.

Whatever the clamp configuration, the present disclosure can use any suitable materials of construction for any component. Exemplary materials of construction include metals, such as steel and aluminum, plastics and combinations thereof.

Although the present invention has been described with reference to preferred embodiments, workers skilled in the art will recognize that changes may be made in form and detail without departing from the spirit and scope of the invention.

The invention claimed is:

1. A clamp for securing a pair of snowmobile skis to a bed having an attached loop, the clamp comprising:
   a main body comprising spaced apart plates configured to provide rigidity to the clamp;
   a hook;
   at least one moveable plate within the main body having a camming surface engaged with the hook; and
   an actuating mechanism proximate an end of the main body, the actuating mechanism configured to position the clamp into an unclamped position wherein the hook is disengaged from the loop attached to the bed and a clamped position where the hook engages the loop and is configured to apply a downward force on the skis by moving the at least one actuator plate within the main body to raise the hook through engagement with the camming surface.

2. The clamp of claim 1, wherein the actuating mechanism comprises an over center toggle coupled to the at least one movable plate wherein movement of the over center toggle causes the clamp to be positioned between the clamped and the unclamped position.

3. The clamp of claim 2, wherein the actuating mechanism further comprises a tension adjuster configured to adjust the range of motion of the moveable plate between the clamped and unclamped position.

4. The clamp of claim 3, wherein the tensioning adjuster comprises a threaded shaft engaging a fixed threaded bore, wherein rotation of the threaded shaft adjusts an effective length between the over center toggle and the at least one movable plate.

5. The clamp of claim 1, wherein the actuating mechanism comprises:
   a strap attached to the at least one plate; and
   a racheting spool configured to spool the strap, wherein when the rachet is manipulated the strap is wound onto the spool causing movement of the at least one moveable plate from the unclamped position to the clamped position.

6. The strap of claim 5, wherein the racheting spool comprises a pawl configured to engage a gear to retain tension on the strap wherein when the pawl is disengaged from the strap the tension is released on the strap resulting in the clamp being positioned into the unclamped position.

7. The clamp of claim 1, wherein the actuating mechanism comprises:
   a pinion coupled to the at least one moveable plate; and
   a spiral gear configured to engage the pinion wherein rotation of the spiral gear moves the pinion and the at least one moveable plate between the clamped and unclamped positions.

8. The clamp of claim 1, wherein the actuating mechanism comprises:
   a rigid member having a threaded surface coupled to the at least one moveable plate; and
   a threaded nut within a rotating grip, wherein rotation of the grip causes the rigid member and the at least one moveable plate to move between the clamped and unclamped positions.

9. The clamp of claim 1, wherein the actuating mechanism comprises:

a first member pivotally coupled to the at least one moveable plate; and a second member comprising a threaded shaft with a distal end pivotally attached to the first member, wherein the threaded shaft is manipulated to manipulate the effective length between the at least one moveable plate and a pivotal attachment of the threaded shaft to the main body.

10. A clamp for securing a pair of snowmobile skis to a bed having an attached loop, the clamp comprising:

a main body comprising spaced apart plates configured to provide rigidity to the clamp;

a hook;

at least one plate pivotally attached to the main body at a first pivotal attachment, wherein the hook is attached to the at least one plate at an attachment location a distance from the first pivotal attachment; and an actuating mechanism having an engaging end for user a user proximate an end of the main body wherein the actuating mechanism is pivotally attached to the plate at a second pivotal attachment, wherein the second pivotal attachment is spaced from the first pivotal attachment and the attachment location, the actuating mechanism configured to pivot about the first pivotal attachment to position the clamp into an unclamped position wherein the hook is disengaged from the loop attached to the bed and to pivot about the first pivotal attachment to position the clamp into a clamped position where the hook engages the loop and is configured to apply a downward force on the skis by moving the at least one actuator plate within the main body to raise the hook through pivotal movement about the first pivotal attachment.

11. The clamp of claim 10, wherein the actuating mechanism comprises an over center toggle coupled to the at least one plate wherein movement of the over center toggle causes the clamp to be positioned between the clamped and the unclamped position.

12. The clamp of claim 11, wherein the actuating mechanism further comprises a tension adjuster configured to adjust the range of motion of the plate between the clamped and unclamped position.

13. The clamp of claim 12, wherein the tensioning adjuster comprises a threaded shaft engaging a fixed threaded bore, wherein rotation of the threaded shaft adjusts an effective length between the over center toggle and the at least one plate.

14. The clamp of claim 10, wherein the actuating mechanism comprises:

a strap attached to the at least one plate; and a racheting spool configured to spool the strap, wherein when the rachet is manipulated the strap is wound onto the spool causing movement of the at least one plate from the unclamped position to the clamped position.

15. The strap of claim 14, wherein the racheting spool comprises a pawl configured to engage a gear to retain tension on the strap wherein when the pawl is disengaged from the strap the tension is released on the strap resulting in the clamp being positioned into the unclamped position.

16. The clamp of claim 10, wherein the actuating mechanism comprises:

a pinion coupled to the at least one plate; and a spiral gear configured to engage the pinion wherein rotation of the spiral gear moves the pinion and the at least one plate between the clamped and unclamped positions.

17. The clamp of claim 10, wherein the actuating mechanism comprises:

a rigid member having a threaded surface coupled to the at least one plate; and a threaded nut within a rotating grip, wherein rotation of the grip causes the rigid member and the at least one plate to move between the clamped and unclamped positions.

18. The clamp of claim 10, wherein the actuating mechanism comprises:

a first member pivotally coupled to the at least one plate; and a second member comprising a threaded shaft with a distal end pivotally attached to the first member, wherein the threaded shaft is manipulated to manipulate the effective length between the at least one moveable plate and a pivotal attachment of the threaded shaft to the main body.

* * * * *